United States Patent
Bialer et al.

(10) Patent No.: US 10,976,411 B2
(45) Date of Patent: Apr. 13, 2021

(54) CLASSIFICATION OF DETECTED REFLECTIONS IN A SENSING SYSTEM

(71) Applicant: GM GLOBAL TECHNOLOGY OPERATIONS LLC, Detroit, MI (US)

(72) Inventors: Oded Bialer, Petah Tivak (IL); Tom Tirer, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 228 days.

(21) Appl. No.: 16/141,008

(22) Filed: Sep. 25, 2018

(65) Prior Publication Data

US 2020/0096608 A1     Mar. 26, 2020

(51) Int. Cl.
   *G01S 7/41*       (2006.01)
   *G01S 13/931*     (2020.01)
   *G01S 13/02*      (2006.01)

(52) U.S. Cl.
   CPC ............ *G01S 7/412* (2013.01); *G01S 13/931* (2013.01); *G01S 2013/0263* (2013.01)

(58) Field of Classification Search
   CPC ..................................................... G01S 7/412
   See application file for complete search history.

(56) References Cited

U.S. PATENT DOCUMENTS

| | | | | |
|---|---|---|---|---|
| 2007/0001897 | A1* | 1/2007 | Alland | H01Q 21/0006 342/70 |
| 2013/0088393 | A1* | 4/2013 | Lee | G01S 7/354 342/372 |
| 2013/0176173 | A1* | 7/2013 | Chew | H01Q 3/2629 342/372 |
| 2016/0252608 | A1* | 9/2016 | Ebling | G01S 13/931 342/149 |
| 2020/0041610 | A1* | 2/2020 | Longman | G01S 7/352 |
| 2020/0057137 | A1* | 2/2020 | Solodky | G01S 13/931 |

* cited by examiner

*Primary Examiner* — Marcus E Windrich
(74) *Attorney, Agent, or Firm* — Cantor Colburn LLP

(57) ABSTRACT

Systems, vehicles, and techniques are provided to classify reflection detection points in a sensing system. A reflection detection point can be classified as an apparent reflection or a physical reflection. In some embodiments, a beamforming map can be generated using a response function of an antenna array and data representative of electromagnetic signals received at the antenna array. Multiple reflection detection points can be detected using at least the beamforming map. A second beamforming distribution map also can be generated, using at least the data and a second response function of the array of antennas. The second response function includes minima at respective reflection points. A ratio between (i) a first amplitude of a reflection detection point in the second beamforming map and (ii) a second amplitude of the reflection point in the first beamforming map permits classifying the reflection detection point as an apparent reflection or a physical reflection.

20 Claims, 8 Drawing Sheets

CLASSIFICATION OF DETECTED REFLECTIONS IN A SENSING SYSTEM

INTRODUCTION

The subject disclosure relates to classification of reflection points in sensing systems that probe reflected electromagnetic radiation from a surrounding environment. Radar reflection points can be estimated by applying beamforming on signals received at an antenna array of a radar system. Yet, each reflection point obtained by means of commonplace approaches to beamforming typically has high-intensity localized amplitudes (usually referred to as a "main lobe") accompanied by less-intense satellite amplitudes (usually referred to as "side lobes"). Therefore, a physical reflection point in an environment probed by the radar system may be detected as a main-lobe centered around the physical reflection point, with undesired side-lobes. Although side lobes have amplitudes that are less intense that those of the main lobe, sensing systems often falsely characterize side lobes as "ghost" targets.

Detection of ghost targets can cause unreliable characterization of an environment of a vehicle (autonomous or otherwise), creating potential issues or risks during the operation of the vehicle.

Accordingly, it is desirable to provide technologies for the classification of detected reflections in radar systems and other types of sensing systems that probe reflected electromagnetic radiation from a surrounding environment.

SUMMARY

In one exemplary embodiment, the disclosure provides a method. The method includes generating a first beamforming map using at least a first response function of an antenna array and data representative of electromagnetic signals received at the antenna array; and determining multiple reflection detection points using at least the first beamforming map. The method also includes generating a second beamforming map using at least the data and a second response function of the array of antennas. The second response function has a first minimum at a first reflection detection point of a subgroup of the multiple reflection detection points and a second minimum at a second reflection detection point of the subgroup. The method further includes determining a ratio between a first amplitude of the third reflection detection point in the second beamforming map and a second amplitude of a third reflection point in the first beamforming map. The method also includes determining that the ratio is less than a threshold value. The method further includes classifying the third reflection detection point as an apparent reflection point.

In addition to the one or more elements disclosed herein, the method also includes updating a dataset indicative of the multiple reflection detection points by removing the third reflection detection point from the dataset.

In addition to the one or more elements disclosed herein, the method also includes supplying the updated dataset to a control system configured to adjust operation of a vehicle using at least the updated dataset.

In addition to the one or more elements disclosed herein, the method also includes determining a ratio between a first amplitude of a fourth reflection detection point in the second beamforming map and a second amplitude of the fourth reflection point in the first beamforming map; determining that the ratio is greater than the threshold value; and classifying the fourth reflection detection point as a physical reflection point.

In addition to the one or more elements disclosed herein, the method also includes determining that the ratio is less than the threshold value comprises determining that the ratio is less than about 15 dB.

In addition to the one or more elements disclosed herein in connection with the method, the generating the second beamforming distribution map includes determining an array having multiple response functions corresponding to the first response function evaluated at respective ones of the multiple reflection detection points.

In addition to the one or more elements disclosed herein in connection with the method, the generating the second beamforming distribution map further includes generating the second response function by solving an optimization problem with respect to an objective function based at least on the array and subject to a constraint indicative of a conservation rule, and wherein the conservation rule requires that the second response function preserve unit gain at the third reflection detection point relative to the first response function.

In another exemplary embodiment, the disclosure provides a system. The system includes at least one processor and at least one memory device coupled to the at least one processor. The at least one memory device having instructions encoded thereon that, in response to execution, cause the at least on processor to perform or facilitate operations including: generating a first beamforming map using at least a first response function of an antenna array and data representative of electromagnetic signals received at the antenna array; determining multiple reflection detection points using at least the first beamforming map; generating a second beamforming map using at least the data and a second response function of the array of antennas, the second response function has a first minimum at a first reflection detection point of a subgroup of the multiple reflection detection points and a second minimum at a second reflection detection point of the subgroup; determining a ratio between a first amplitude of the third reflection detection point in the second beamforming map and a second amplitude of a third reflection point in the first beamforming map; determining that the ratio is less than a threshold value; and classifying the third reflection detection point as an apparent reflection point.

In addition to the one or more elements disclosed herein in connection with the system, the operations also include comprising updating a dataset indicative of the multiple reflection detection points by removing the third reflection detection point from the dataset.

In addition to the one or more elements disclosed herein in connection with the system, the operations also include supplying the updated dataset to a control system configured to adjust operation of a vehicle using at least the updated dataset.

In addition to the one or more elements disclosed herein in connection with the system, the operations also include determining a ratio between a first amplitude of a fourth reflection detection point in the second beamforming map and a second amplitude of the fourth reflection point in the first beamforming map; determining that the ratio is greater than the threshold value; and classifying the fourth reflection detection point as a physical reflection point.

In addition to the one or more elements disclosed herein in connection with the system, the determining that the ratio is less than the threshold value comprises determining that the ratio is less than about 15 dB.

In addition to the one or more elements disclosed herein in connection with the system, the generating the second beamforming distribution map includes determining an array having multiple response functions corresponding to the first response function evaluated at respective ones of the multiple reflection detection points.

In addition to the one or more elements disclosed herein in connection with the system, the generating the second beamforming distribution map further includes generating the second response function by solving an optimization problem with respect to an objective function based at least on the array and subject to a constraint indicative of a conservation rule, and wherein the conservation rule requires that the second response function preserve unit gain at the third reflection detection point relative to the first response function.

In addition to the one or more elements disclosed herein in connection with the system, the antenna array is functionally coupled to at least one of a radar system or a light detection and ranging system.

In yet another exemplary embodiment, the disclosure provides a vehicle. The vehicle includes an antenna array configured to receive electromagnetic signals, and a beamforming apparatus functionally coupled to the antenna array. The beamforming apparatus is configured at least to generate a first beamforming map using at least a first response function of the antenna array and data representative of the electromagnetic signals. The beamforming apparatus also is configured to determine multiple reflection detection points using at least the first beamforming map. The beamforming apparatus is further configured to generate a second beamforming map using at least the data and a second response function of the antenna array. The second response function has a first minimum at a first reflection detection point of a subgroup of the multiple reflection detection points and a second minimum at a second reflection detection point of the subgroup. The beamforming apparatus is further configured to determine a ratio between a first amplitude of the third reflection detection point in the second beamforming map and a second amplitude of a third reflection point in the first beamforming map. The beamforming apparatus is still further configured to determine that the ratio is less than a threshold value and to classify the third reflection detection point as an apparent reflection point.

In addition to the one or more elements disclosed herein, the beamforming apparatus is further configured to determine a ratio between a first amplitude of a fourth reflection detection point in the second beamforming map and a second amplitude of the fourth reflection point in the first beamforming map. The beamforming apparatus is further configured to determine that the ratio is greater than the threshold value. The beamforming apparatus also is configured to classify the fourth reflection detection point as a physical reflection point.

In addition to the one or more elements disclosed herein, to generate the second beamforming distribution map, the beamforming apparatus is further configured to determine an array having multiple response functions corresponding to the first response function evaluated at respective ones of the multiple reflection detection points.

In addition to the one or more elements disclosed herein, to generate the second beamforming distribution map, the beamforming apparatus is further configured to generate the second response function by solving an optimization problem with respect to an objective function based at least on the array and subject to a constraint indicative of a conservation rule. The conservation rule requires that the second response function preserve unit gain at the third reflection detection point relative to the first response function.

In addition to the one or more elements disclosed herein, the vehicle further includes a control apparatus, and the beamforming apparatus is further configured to supply the updated dataset to a control system configured to adjust operation of the vehicle using at least the updated dataset.

The above features and advantages, and other elements and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

The disclosure recognizes and addresses, in at least some embodiments, the issue of distinguishing apparent reflection points from physical reflection points in sensing systems that probe reflected EM radiation to detect objects within the environment. Embodiments of this disclosure include systems, apparatuses, vehicles, and techniques that, individually or in combination, permit or otherwise facilitate classifying reflection detection points in a sensing system. The reflection detection points can be classified with a methodology that is consistent with the beamforming approach utilized to determine the reflection detection points. More specifically, in one example, a false reflection point of beamforming side-lobes can be detected by applying beamforming to a side-lobe point under classification while nulling other reflection detection points in a vicinity of the side-lobe point. It is noted that, in some instances, nulling is practically achieved by obtaining a finite amplitude that is several orders of magnitude smaller than in the absence of nulling. In some embodiments, reflection detection points classified as apparent reflection points can be eliminated from further processing at the sensing system of another system functionally coupled thereto.

Figure 1:
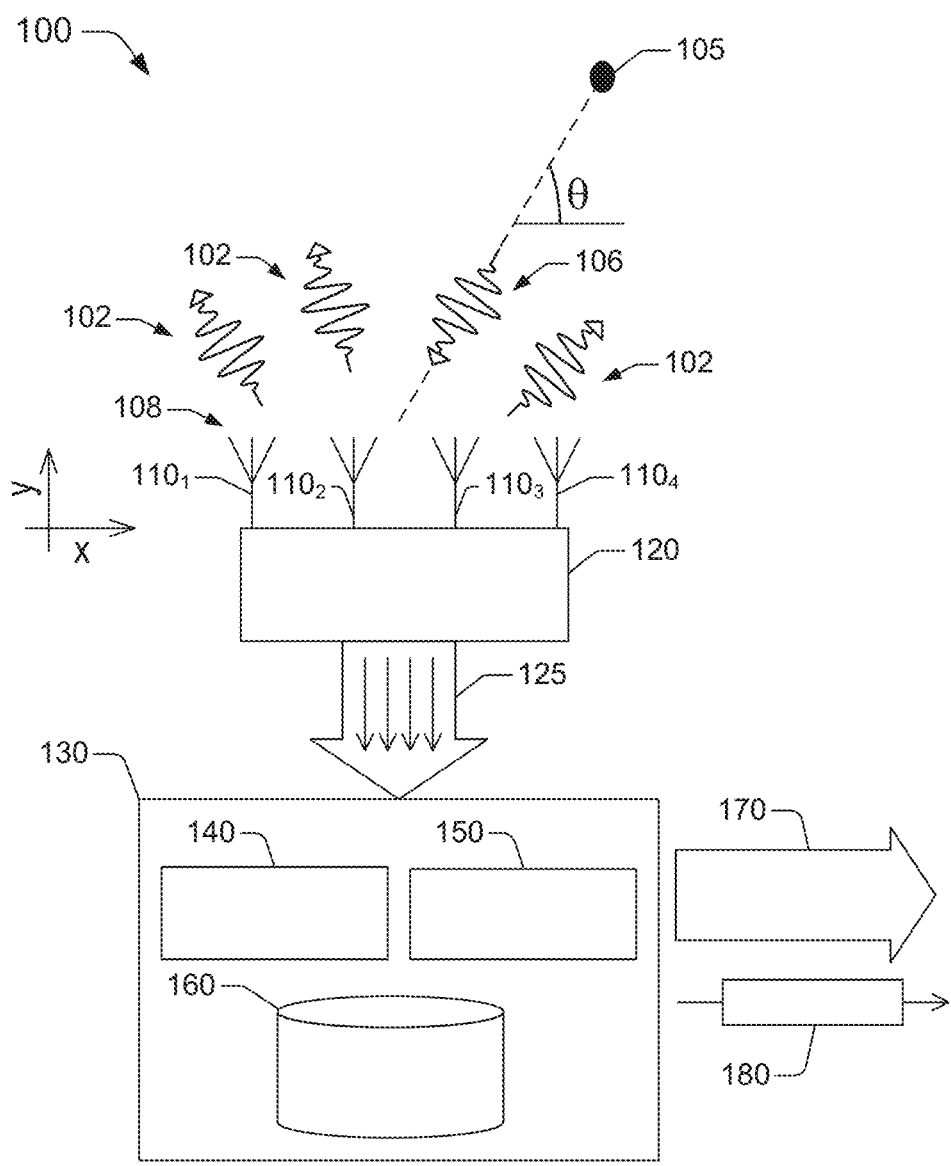
FIG. 1 presents an example of an operational environment to classify reflection detection points in a sensing system, in accordance with one or more embodiments of the disclosure.

With reference to the drawings, FIG. 1 presents an example of an operational environment 100 to classify reflection detection points in a sensing system, in accordance with one or more embodiments of the disclosure. The illustrated operational environment 100 includes an antenna array 108 that includes a first antenna $110_1$, a second antenna $110_2$, a third antenna $110_3$, and a fourth antenna $110_4$. The disclosure, however, is not limited to four antennas. The antenna array 108 can include, in some embodiments, more than four antennas or less than four antennas. Regardless of the number of antennas, the array of antennas can emit electromagnetic radiation 102. To that end, the array of antennas can be functionally coupled (e.g., mechanically coupled, electrically coupled and/or electromagnetically coupled) to a communication processing unit 120 that permits or otherwise facilitates generating an alternating electric signal that causes each one (or, in some embodiments, at least one) of the antennas $110_1$-$110_4$ in the array of antennas to emit the electromagnetic radiation (EM).

The electromagnetic radiation 102 that is emitted can be scattered in an environment that surrounds the array of antennas. At least a portion of the electromagnetic radiation 102 can be reflected by an object 105 within the environment. At least a portion of reflected radiation 106 can be received by the array of antennas. More specifically, the electromagnetic radiation 106 can be received by one or more of the antennas $110_1$-$110_4$, depending on the object that reflects the electromagnetic radiation 102, environmental conditions for the propagation of the reflected electromagnetic radiation 106, and the like.

The communication processing unit 120 can generate data representative of at least a portion of the reflected electromagnetic radiation 106 that is received by the antenna array 108. The data can include one or more data streams and can be formatted according to a defined protocol for digital data transmission. In addition, the communication processing unit 120 can supply (e.g., send and/or make available) the generated data to a beamforming system 130. A communication structure 125 can functionally couple the communication processing unit 120 and the beamforming system 130. The communication structure 125 can be embodied in or can include a bus architecture, wireline link(s), wireless link(s), router device(s), gateway device(s), a combination thereof, or the like.

The beamforming system 130 can receive the data representative of reflected electromagnetic radiation 106 that is received by the antenna array 108 and can perform a beamforming process that operates on the data. To that end, the beamforming system 130 can include a beamforming component 140. Performing such a beam process permits detecting reflection points in the environment that surrounds the antenna array 108 including antennas $110_1$-$110_4$. Executing the beamforming process can be referred to as applying beamforming to the data or performing beamforming on the data. Regardless of nomenclature, executing the beamforming process can generate a two-dimensional map representative of an amplitude (or strength) of scattering of electromagnetic radiation at a defined range R and a defined azimuth angle θ relative to a horizon (x direction in the reference frame shown in FIG. 1). Here, R is a real number in units of distance and θ is a real number in units of angle (radians or degrees, for example)).

More specifically, executing the beamforming process generates an output vector of complex numbers for a defined group of angles {θ} and a defined range R of a target detection point. The output vector of complex numbers is generated from both (i) a vector y of data indicative of analog signals generated in response to the electromagnetic radiation received at the antenna array 108, and (ii) a matrix of observed received signals at each antenna of the antenna array 108 for each angle of arrival for the target detection point. An angle of arrival is subtended by the horizon (x direction in FIG. 1) that defines θ and a line of sight from the antenna to the target detection point. The matrix can be referred to as a response function of the antenna array 108.

Figure 2:
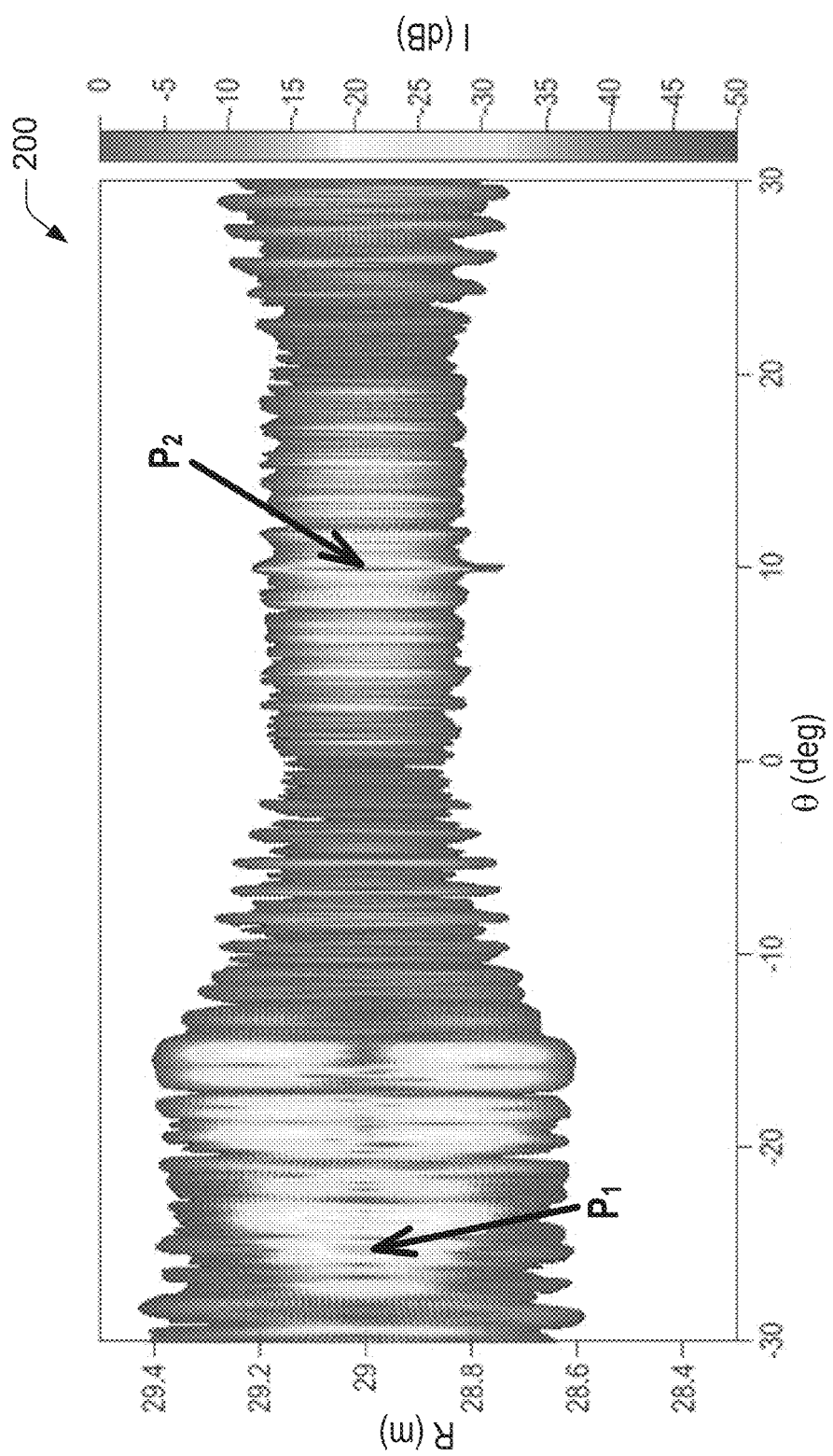
FIG. 2 presents an example of a beamforming map in accordance with one or more embodiments of the disclosure.

As an illustration, applying beamforming to data representative of EM radiation (e.g., reflected electromagnetic radiation 106) received at the antenna array 108 can result in the beamforming map 200 shown in FIG. 2. As mentioned, for a defined range R and a defined azimuth angle θ the beamforming map 200 provides a defined amplitude (labeled "I" in FIG. 2), which can be expressed in dB. In addition, regions of the beamforming map 200 present amplitudes much larger than a baseline amplitude (which is about −50 dB in the illustrated example). In such regions, a detection point (R, θ) can correspond to an apparent reflection or a physical reflection. Specifically, the beamforming map 200 includes a first reflection detection point $P_1$ and a second reflection detection point $P_2$. The amplitude of detection points near $P_1$ is greater than the magnitudes of the detection points near $P_2$. Therefore, $P_2$ is a candidate to be an artifact (e.g., side-lobe of $P_1$).

With further reference to FIG. 1, to classify a detection point (R, θ) as either corresponding to an apparent reflection or corresponding to a physical reflection, the beamforming system 130 includes an analysis component 150. The beamforming system 130 can utilize or otherwise leverage the analysis component 150 to determine a set of N ranges $\{R_1, R_2 \ldots R_N\}$ (N is a natural number) and a set of N azimuth angles $\{\theta_1, \theta_2 \ldots \theta_N\}$. Each range $R_n$ (1≤n≤N) lies within a defined interval ΔR and each azimuth angle $\theta_N$ lies within a defined interval Δθ. The intervals ΔR and Δθ determine a region that potentially includes a side lobe. Thus, each defined detection point $(R_n, \theta_n)$ (1≤n≤N) can be selected relative to a test detection point $(R_0, \theta_0)$ that is a candidate for classification as a physical reflection. For example, with reference to the beamforming map 200 in FIG. 2, the region determined by ΔR and Δθ can encompass $P_2$ and $(R_0, \theta_0)$ can correspond to $P_1$.

The beamforming system 130 also can utilize or otherwise leverage the analysis component to determine a response function of the antenna array 108 for each defined detection point $(R_n, \theta_n)$ (1≤n≤N). In addition, the beamforming system 130 can configure, by means of the analysis component 150, for example, the following matrix:

$$A_{null}=[\alpha(R_1,\theta_1)\alpha(R_2,\theta_2) \ldots \alpha(R_n,\theta_n)]. \quad (1)$$

The matrix $A_{null}$ has array response signals corresponding to the entire set of defined points $(R_n, \theta_n)$.

Further, the beamforming system 130 determines a beamforming vector w(R, θ) for range R and azimuth θ that, in response to being applied to vector y, yields a beamforming distribution that nulls (e.g., has a zero amplitude) at each detection point $(R_n, \theta_n)$. Therefore, in this disclosure, $\alpha(R_n, \theta_n)$ represents a vector of response signals to be nulled for range $R_n$ and azimuth $\theta_n$.

The beamforming vector w(R, θ) can be defined as a solution of the following optimization problem:

$$w(R,\theta)=\mathrm{argmin}_w w^H A_{null} A_{null}^H w + \lambda w^H w \cdot r \cdot t.$$

$$w^H \alpha(R,\theta)=1 \quad (2)$$

Here, λ is a scalar regularization parameter that controls noise enhancement, $A_{null}^H$ is the Hermitian matrix of $A_{null}$, and $w^H$ is the Hermitian of beamforming vector w. In other terms, solving the optimization problem permits obtaining the beamforming vector w(R, θ) to range and angle (R, θ) that has unit energy to the pointing range and angle, R, θ, while simultaneously minimizing the energy of the other undesired reflection directions.

As stated, the optimization problem in Eq. (2) is solved subject to $w^H\alpha(R, \theta)=1$, which represents conservation of total received EM energy. In other words, a transformation from beamforming vector α(R, θ) to w(R, θ) preserves the reflection intensity from R, θ while minimizing the reflection intensity of the ranges and angles that were used to construct $A_{null}$.

A solution to the optimization problem in Eq. (2) is:

$$w(R, \theta) = \frac{(A_{null}A_{null}^H + \lambda I)^{-1}a(R, \theta)}{a^H(R, \theta)(A_{null}A_{null}^H + \lambda I)^{-1}a(R, \theta)} \quad (3)$$

The beamforming system 130 can retain such a solution in one or more memory devices 160 (generically referred to as beamforming data 160).

The beamforming system 130 can perform a second beamforming process, applying w(R, θ) to the vector y of data indicative of analog signals generated in response to the electromagnetic radiation (e.g., reflected electromagnetic radiation 106) received at the antenna array 108. To that end, the beamformer component 140 can compute $w^H(R, \theta)y$. The output of performing the second beamforming process can be retained in the beamforming data 160. Such an output permits or otherwise facilitates determining if a detection point corresponds to a physical reflection point in an environment of the multi-antenna receiver.

Figure 3:
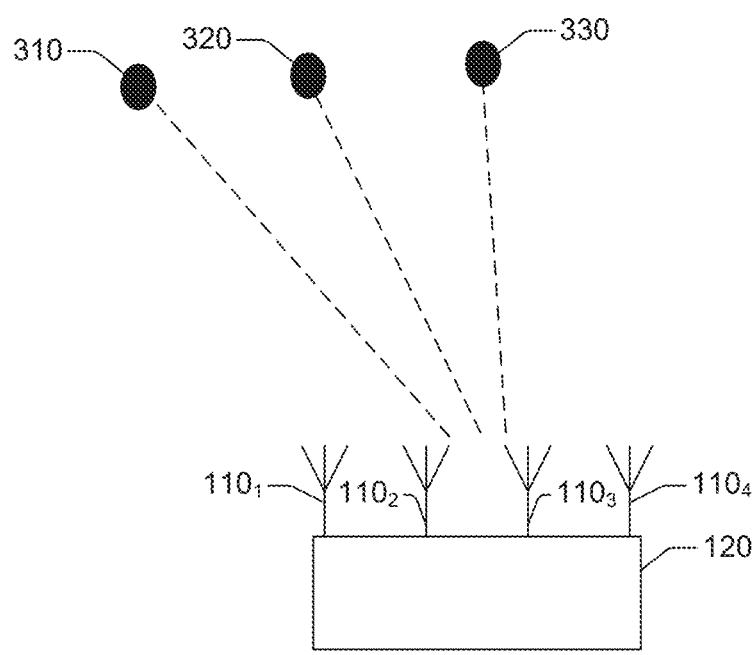
FIG. 3 presents a schematic arrangement of detection points for classification of reflection detection points in a sensing system in accordance with one or more embodiments of this disclosure.

To that end, more concretely, the beamforming system 130 can select a first detection point $(R_k, \theta_k)$ (k is a natural number) that is a first reflection point—the first detection point has a beamforming amplitude $|\alpha^H(R_k, \theta_k)y|$ greater than a defined threshold value. The first reflection point can have a neighboring second reflection point $(R_l, \theta_l)$ (l is a natural number) and a neighboring third reflection point $(R_m, \theta_m)$ (m is a natural number). For the sake of illustration, with reference to FIG. 3, consider that the first reflection point corresponds to detection point 320 and that the second and third reflection points correspond, respectively, to detection point 310 and detection point 330.

The beamforming system 130 can apply beamforming to the first reflection point $(R_k, \theta_k)$ (e.g., detection point 320) while simultaneously nulling the response from the second reflection point $(R_l, \theta_l)$ (e.g., detection point) and the third reflection point $(R_m, \theta_m)$ (e.g., detection point). In a scenario in which the first reflection point (e.g., detection point 320) is an apparent reflection point because the first reflection point pertains to a satellite (or side lobe) beamforming signal of the second reflection point (e.g., detection point 310) and/or the third reflection point (e.g., detection point 330), the output of the beamforming can yield an amplitude at the first reflection point that is significantly less than the amplitude generated by applying beamforming without nulling. In contrast, in a scenario in which the first reflection point (e.g., detection point 320) is a physical reflection point, the output of the beamforming can yield an amplitude at the first reflection point that is comparable or essentially the same as the amplitude generated by applying beamforming without nulling.

As such, a metric μ (for the sake of nomenclature) based on such beamforming can be defined to evaluate if a detection point corresponds to a physical reflection point. In one embodiment, the metric is $\mu=|w^H(R, \theta)y|/|\alpha^H(R, \theta)y|$, where μ is a real number. A rule or another type of criterion can be applied to the metric μ to determine if the detection point can be classified as a physical reflection point. For instance, in scenarios in which μ is approximately 1, then a detected reflection point corresponds to a physical reflection point. In some embodiments, a metric μ that is less than a defined threshold value can permit ascertaining that the detection point corresponds to an apparent reflection point. In one example, the threshold value can be 0.3 (or 10 dB). In other embodiments, the threshold value can be selected from a range from about 5 dB to about 15 dB. In the alternative the detection point can be classified as a physical reflection point.

With further reference to FIG. 1, the beamforming system 130 can analyze a set of defined detection points $\{R\}=\{(R_n, \theta_n)\}_{n=1, 2, \ldots N}$ to classify each (or, in some embodiments, at least one) detection point as an apparent reflection point or a physical reflection point. Specifically, for each detection point in {R}, the beamforming system 130 can focus the array response to the detection point while simultaneously nulling the response from at least one neighboring detection point. In addition, the beamforming system 130 can compare the focused EM energy, as represented by the amplitude of the beamforming, in the absence of nulling and with nulling included. Based on the outcome of such a comparison, the beamforming system 130 can provide a classification 180 for one or more of the detection points in {R}.

In some embodiments, the classification 180 can be utilized to update a dataset indicative of reflection detection points. For instance, the beamforming system 130 can update (or, in one embodiment, can cause another system to update) extant reflection detection point data (e.g., the data 170) by removing one or more reflection detection points classified as apparent reflection points. In addition, or in other embodiments, the beamforming system 130 can supply (e.g., send or make available) the updated dataset to a control system (not depicted in FIG. 1) configured to adjust operation of a vehicle using at least the updated dataset. The vehicle includes the beamforming system 130.

More concretely, with reference to classification of a reflection detection point, in one example, the beamforming map 200 illustrated in FIG. 2 includes a first reflection detection point $P_1$ and a second reflection detection point $P_2$. The amplitude of detection points in the vicinity of $P_1$ is greater than the magnitudes of the detection points in the vicinity of $P_2$. Therefore, $P_2$ is a candidate to be an artifact (e.g., side-lobe of $P_1$). While conventional approaches to beamforming typically fail to classify such points, much less employ a quantitative analysis consistent with an applied beamforming process, embodiments of the disclosure can classify $P_1$ and $P_2$ and, thus, distinguish such points, without reliance on ad hoc analysis of a beamforming map.

Figure 4:
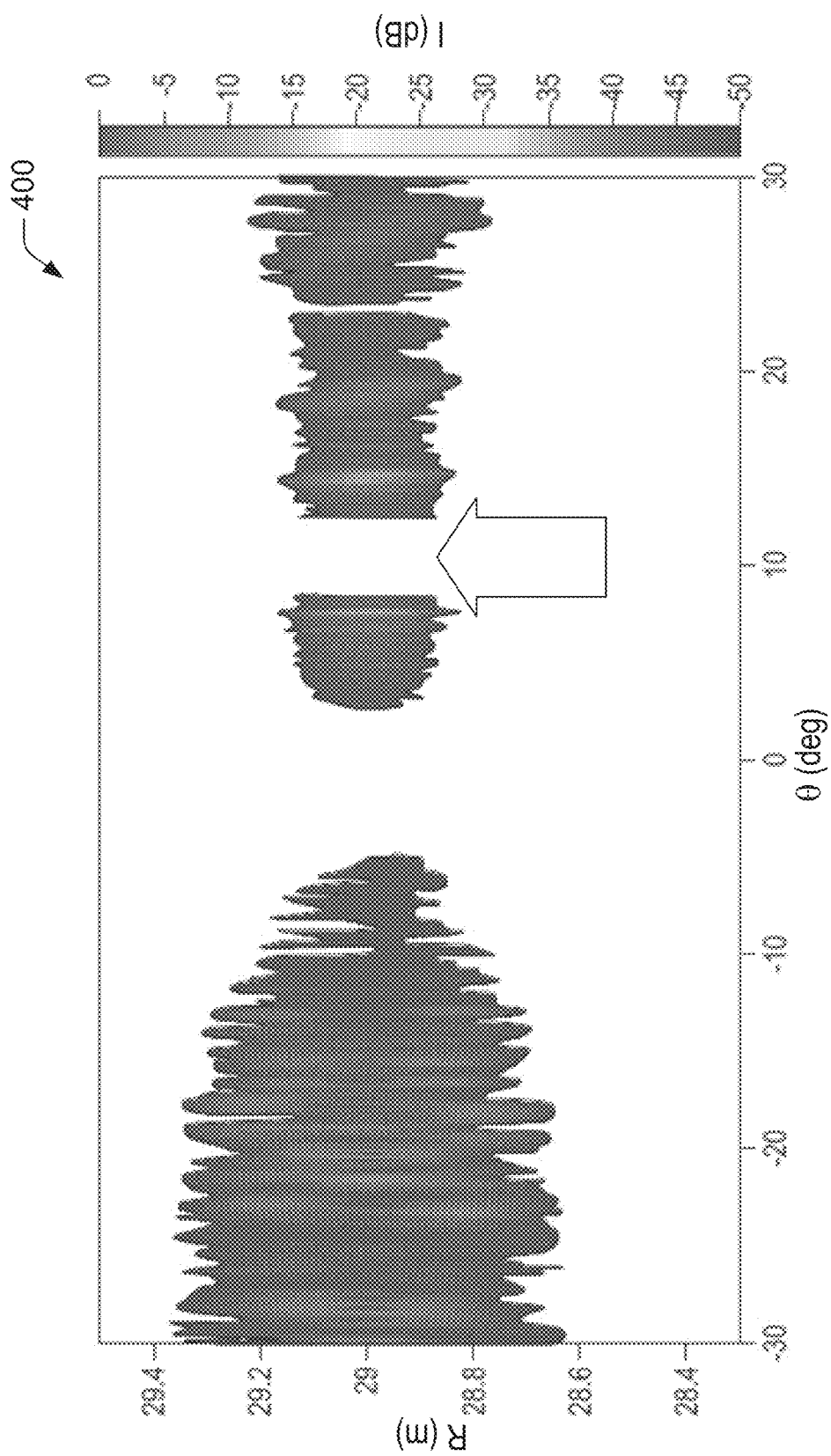
FIG. 4 presents an example of a beamforming map in accordance with one or more embodiments of the disclosure.
Figure 5:
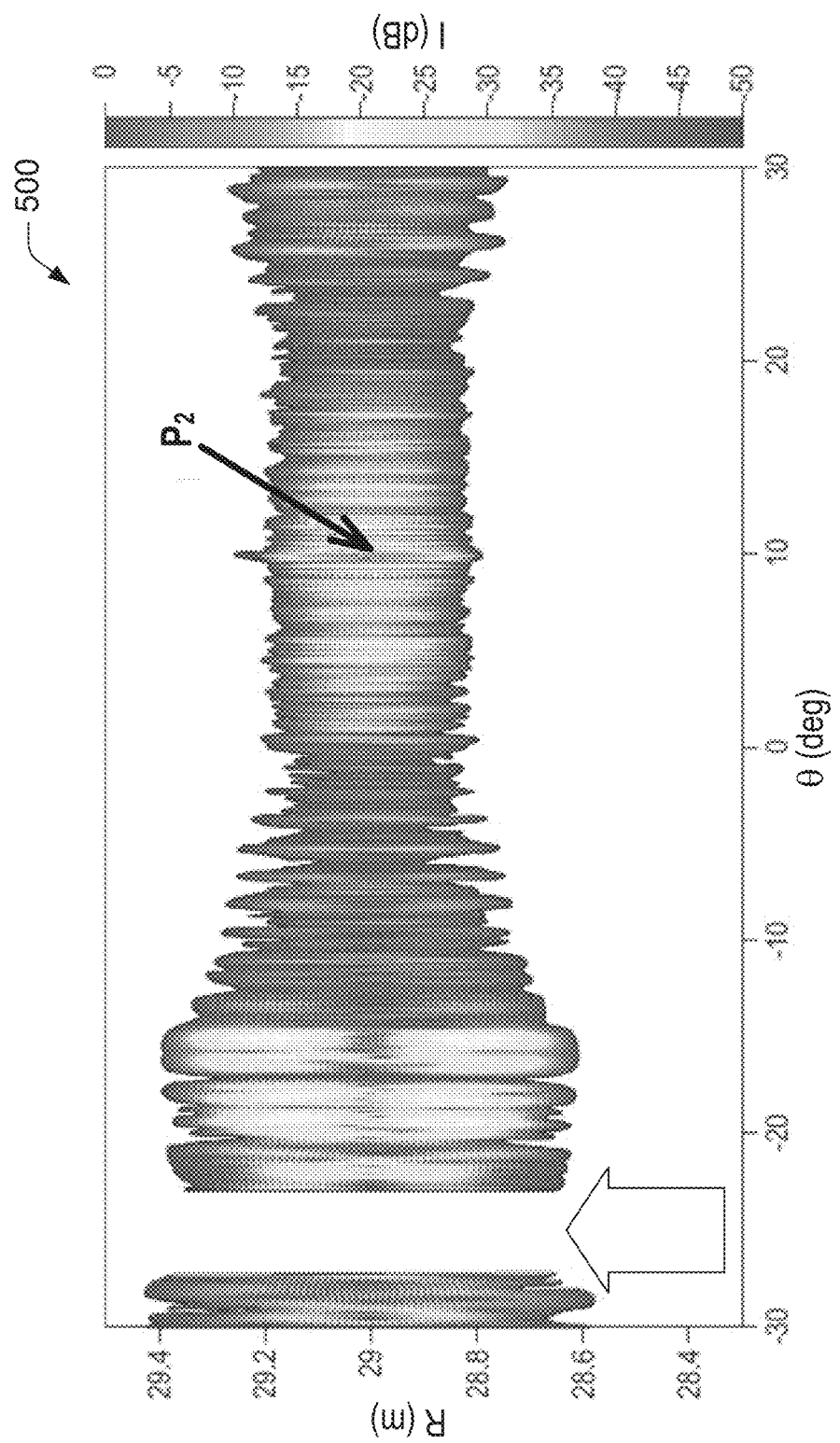
FIG. 5 presents yet another example of a beamforming map in accordance with one or more embodiments of the disclosure.

Specifically, implementing the classification analysis described herein, a vicinity of a reflection detection point can be nulled while beamforming directed to another detection point is performed. As mentioned, such a vicinity is determined by respective defined intervals in range and azimuth. FIG. 4 illustrates a beamforming map 400 determined according to such an approach of this disclosure. As in other beamforming maps of the disclosure, the beamforming map 400 provides a defined amplitude (labeled "I" in FIG. 4), which can be expressed in dB, at a defined range R and azimuth angle θ. As it can be gleaned from FIG. 4, detection point $P_1$ (as is shown in FIG. 2) can be classified as an apparent reflection point because the beamforming amplitude at detection point $P_1$ when nulling (which is represented with a large arrow in FIG. 4) to point $P_2$ is significantly less than the beamforming amplitude at $P_1$ that is obtained by beamforming in the absence of such nulling. Further, FIG. 5 illustrates a beamforming map 500 determined according to aspects of this disclosure. As mentioned, for a defined range R and a defined azimuth angle θ, the beamforming map 500 provides a defined amplitude (labeled "I" in FIG. 5), which can be expressed in dB. As is illustrated in FIG. 5, the amplitudes in the vicinity of the point $P_2$ (also shown in FIG. 2) remain nearly unchanged in response to applying beamforming directed to $P_2$ while nulling (or, in some instances, minimizing) a vicinity of $P_1$ (see FIG. 2) defined by specific intervals ΔR and Δθ. Such nulling is represented with a large arrow in FIG. 5. Therefore, $P_2$ can be identified as a physical reflection point.

Without intending to be bound by theory and/or modeling, the essentially unchanged amplitude of detection point $P_2$ in the presence of nulling (see, e.g., large arrow in FIG. 5) originates from the fact that signal contributions in the beamforming are not caused by fictitious sources of signal received at the antenna array 108, but rather from signal scattered by a physical object in an environment of the antenna array 108. Thus, nulling at a vicinity of $P_1$ (which nulling is represented with a large arrow in FIG. 5) or any other portion of the beamforming map 200 that is distant from detection point $P_2$, causes no changes in the source of received signal, resulting in the essentially unchanged amplitude. In sharp contrast, the amplitude of detection point $P_1$ or any other detection point in a side lobe arises from the beamforming in the presence of physical signal from the physical object associated with detection point $P_2$. As such, nulling (or, in some instances, minimizing) in a vicinity of detection point $P_2$ effectively removes the source of signal for detection point $P_1$ and, thus, the amplitude of detection point $P_1$ decreases significantly relative to beamforming in the absence of such nulling. Accordingly, the disclosure provides an analysis probe that includes the nulling described herein in combination with the determination of a beamformer in the presence of the nulling, where the beamformer is subject to gain conservation relative to beamforming in the absence of nulling.

While the principles of classification of reflection points disclosed herein are illustrated in connection with detection points $P_1$ and $P_2$ in an example beamforming map, the disclosure is not limited to a pair of detection points nor is the disclosure limited to the beamforming map 200 illustrated herein. Instead, any detection point P in a beamforming map can be analyzed based on other detection points {P', P'', . . . } in the beamforming map.

It is also noted that the antenna array 108, the communication structure 125, and the beamforming system 130 (including embodiments in which such a system is retained in a memory device and configured to be executed by a processor) can embody or otherwise constitute a radar system, a light detection and ranging (LIDAR) system, or most any sensing system that probes reflected EM radiation to detect objects in the surroundings of the sensing system.

Figure 6:
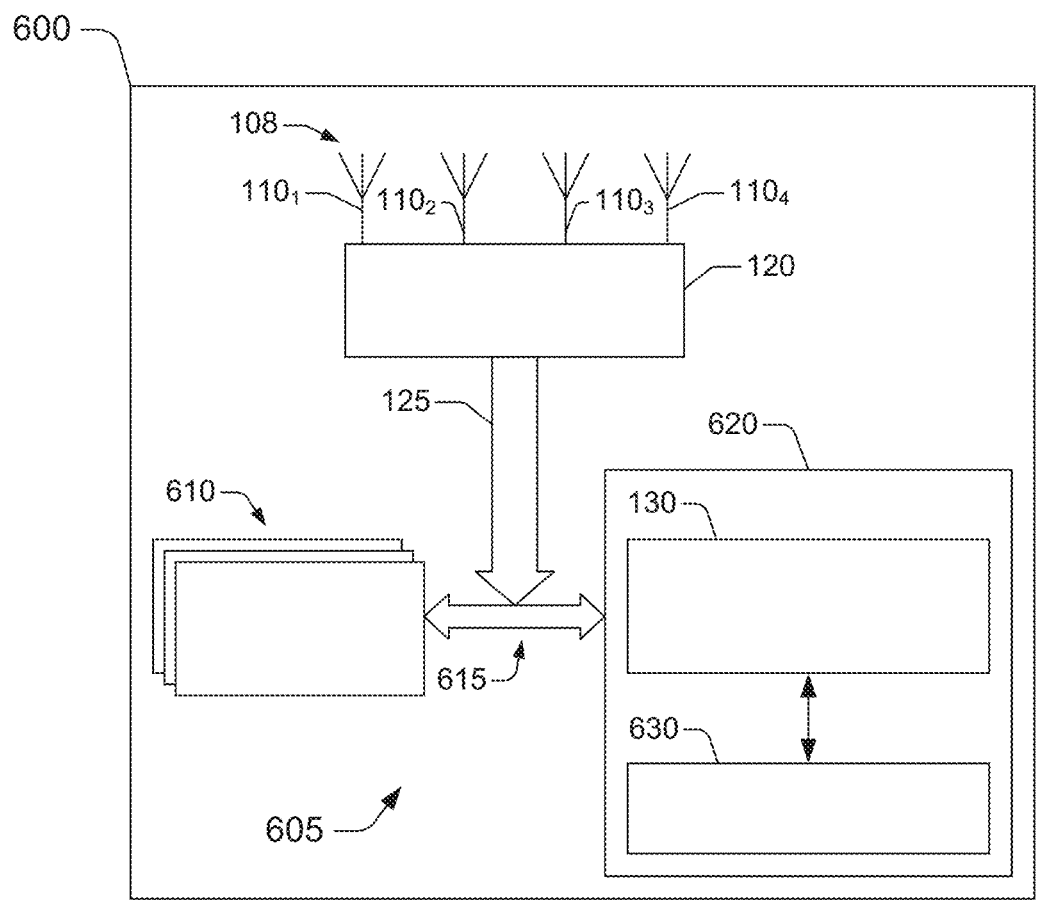
FIG. 6 presents an example of a vehicle having a system to classify reflection detection points in a sensing system, in accordance with one or more embodiments of the disclosure.

FIG. 6 illustrates an example of a vehicle 600 including a computing system 605 to classify reflection detection points in a sensing system in accordance with this disclosure. The illustrated computing system 605 includes one or more processor(s) 610 and one or more memory devices 620 (generically referred to as memory 620) that include machine-accessible instructions (e.g., computer-readable and/or computer-executable instructions) that can be accessed and executed by at least one of the processor(s) 610. In one example, the processor(s) 610 can be embodied in or can constitute a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), a combination thereof, or the like. In some embodiments, the processor(s) 610 can be arranged in a single computing apparatus (e.g., an electronic control unit (ECU), and in-car infotainment (ICI) system, or the like). In other embodiments, the processor(s) 610 can be distributed across two or more computing apparatuses (e.g., multiple ECUs; a combination of an ICI system and one or several ECUs; or the like).

The one or more processors 610 can be functionally coupled to the memory 620 by means of a communication structure 615. The communication structure 615 is suitable for the particular arrangement (localized or distributed) of the processor(s) 610. In some embodiment, the communication structure 615 can include one or more of bus architectures, such an Ethernet-based industrial bus, a controller area network (CAN) bus, a Modbus, other types of fieldbus architectures, or the like.

As is illustrated in FIG. 6, the vehicle 600 includes the antenna array 108, the communication processing unit 120, and the communication structure 125. The antenna array 108 is configured to receive electromagnetic system reflected by an object within the surroundings of the vehicle 600, for example. As mentioned, the communication processing unit 120 can process signals representative of the received EM radiation to generate data representative of such electromagnetic radiation. The communication processing unit 120 can supply at least a portion of the data via the communication structure 125. At least one of the processor(s) 610 and/or the memory 620 can be coupled to the communication processing unit 120 and, therefore, to the antenna array 108, via one or more components of the communication structure 615.

As is illustrated in FIG. 6, the memory 620 includes the beamforming system 130. Thus, in such an embodiment, machine-accessible instructions (e.g., computer-readable and/or computer-executable instructions) embody or otherwise constitute the beamforming system 130. The machine-accessible instructions are encoded in the memory 620 and can be arranged in software components that can be built (e.g., linked and compiled) and retained in computer-executable form in the memory 620 (as is shown) or in one or more other machine-accessible non-transitory storage media. The beamforming system 130 retained in the memory 620, at least a portion of the communication structure 615, and at least one of the processor(s) 610 can embody or otherwise can constitute a beamforming apparatus. Such a beamforming apparatus can be configured to classify reflection detection points in accordance with aspects of this disclosure. In one aspect, the beamforming apparatus can be configured to supply (e.g., send or make available) reflection detection point data and/or a classification of reflection detection points (e.g., classification 180). In some instances, the reflection detection point data can exclude records indicative of apparent reflection points.

In the computing system 605, the machine-accessible instructions that form the beamforming system 130 can be executed by at least one processor of the processor(s) 460. Execution of the instructions can cause the at least one processor—and, thus, the computing system 605—to provide classification functionality as is disclosed herein. In other words, execution of the beamforming system 130 or a portion thereof can cause the computing system 600 to classify a reflection detection point in a sensing system (e.g., a radar system or a lidar system) in accordance with aspects of this disclosure.

The memory 620 also can retain or otherwise store a control system 630. Accordingly, machine-accessible instructions (e.g., computer-readable and/or computer-executable instructions) embody or otherwise constitute the control system 630. Again, the machine-accessible instructions are encoded in the memory 620 and can be arranged in software components that can be built (e.g., linked and compiled) and retained in computer-executable form in the memory 620 (as is shown) or in one or more other machine-accessible non-transitory storage media. The control system 630 retained in the memory 620, at least a portion of the communication structure 615, and at least one of the processor(s) 610 can embody or otherwise can constitute a control apparatus. Such a control apparatus can be configured to adjust the operation of the vehicle 600 in accordance with aspects of this disclosure.

At least one of the one or more processors 610 can execute the control system 630 to cause the computing system 605—and, thus, the vehicle 600—to implement a control process to adjust or otherwise control the operation of the vehicle 600. To that end, in one aspect, the control process can utilize or otherwise rely on at least a portion of the reflection detection point data 170 and/or the classification 180 (see FIG. 1 and related description) generated by the beamforming system 130. For instance, the control apparatus can be configured to receive a subset of the reflection detection point data 170. Such a subset can exclude records indicative of apparent reflection points. In response, the control apparatus can adjust operation of the vehicle 600 using at least the updated dataset.

It is noted that, while not illustrated in FIG. 6, the computing system 600 also can include other types of computing resources (e.g., interface(s) (such as I/O interfaces; controller devices(s); power supplies; and the like) that can permit or otherwise facilitate the execution of the software components (e.g., engines and modules). To that point, for instance, the memory 620 also can include programming interface(s) (such as application programming interfaces (APIs)), an operating system, firmware, and the like.

Figure 7:
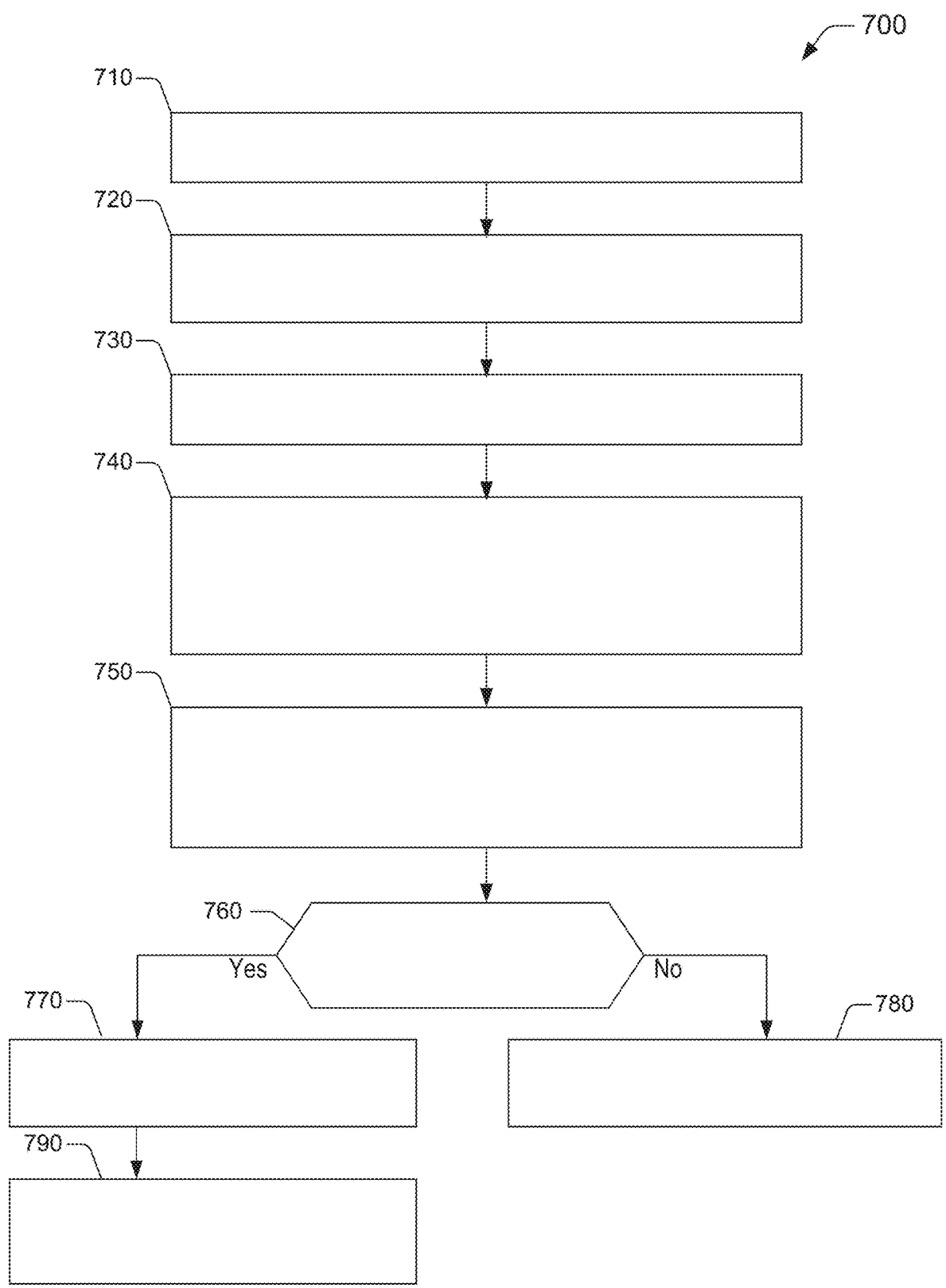
FIG. 7 presents example method for classifying a reflection point in a sensing system in accordance with one or more embodiments of the disclosure.

In view of various aspects described herein, an example of the methods that can be implemented in accordance with this disclosure can be better appreciated with reference to FIG. 7. For purposes of simplicity of explanation, the exemplified methods (and other techniques disclosed herein) are presented and described as a series of operations. It is noted, however, that the exemplified methods and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

In some embodiments, one or several of the example methods and/or other techniques disclosed herein can be represented as a series of interrelated states or events, such as in a state-machine diagram. Other representations also are possible. For example, interaction diagram(s) can represent an exemplified method and/or a technique in accordance with this disclosure in scenarios in which different entities perform different portions of the disclosed methodologies.

It noted that at least some of the techniques disclosed herein can be retained or otherwise stored on an article of manufacture (such as a computer-program product) to permit or otherwise facilitate transporting and transferring such example methods to a computing apparatus for execution, and thus implementation, by processor(s) or for storage in a memory.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the exemplified methods and/or other techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 7 presents a flowchart of an example method 700 for classifying a reflection point in a sensing system in accordance with one or more embodiments of the disclosure. The example method 700 can be implemented, entirely or in part, by a computing system having one or more processors; one or more memory devices; other types of computing resources; a combination thereof; or the like. In some embodiments, the computing system can be embodied in or can include the beamforming system 130, FIG. 1, disclosed herein.

At block 710, the computing system can receive data representative of EM signals received at an array of antennas. At block 720, the computing system can generate a first beamforming map (e.g., beamforming map 200 in FIG. 2) using at least the data and first response function of the array of antennas. For example, the first response function can be or can include $\alpha(R, \theta)$. At block 730, the computing system can determine multiple reflection detection points using at least the first beam forming map.

At block 740, the computing system can generate a second beam forming map (e.g., beamforming map 500 in FIG. 5) using at least the data and a second response function (e.g., $w(R, \theta)$) for the array of antennas. As is disclosed herein, the second response function has nulls (or minima of a respective defined finite amplitudes representative of the nulls) at respective reflection detection points of a subgroup of the multiple reflection detection points. Such a subgroup can include reflection detection points in an interval ($\Delta R$, $\Delta \theta$) relative to a reflection detection point ($R$, $\theta$) for which the response function is null. At block 750, the computing system can determine a difference between a first amplitude of a first reflection detection point in the first beamforming map and a second amplitude of the first reflection detection point in the second beamforming map.

At block 760, the computing system can determine if the difference is less than a defined threshold value (e.g., 10 dB). In response to an affirmative determination ("Yes" branch), the flow of the example method 700 continues to block 770, at which the computing system can classify the first reflection detection point as an apparent reflection point. In the alternative, in response to a negative determination ("No" branch), the flow of the example method 700 can continue to block 780, at which the computing system can classify the first reflection detection point as a physical reflection point.

As is illustrated at block 790, classifying a reflection detection point can permit or otherwise facilitate the computing system to eliminate the detection point classified as an apparent reflection point from a group including the multiple reflection detection points. For instance, the computing system can remove the first reflection detection point from a dataset indicative of the multiple reflection detection points. To that end, in one embodiment, the computing system can update the beamforming data 230 in the beamforming system 130.

While not illustrated in FIG. 7, in some embodiments, the example method 700 can include other operations that utilize or otherwise leverage the classification of a reflection point in a sensing system. In one example embodiment, the computing system can update a dataset indicative of the multiple reflection detection points determined at block 730 by removing from the dataset one or more reflection detection points classified as apparent reflection points. In addition, or in another example embodiment, the computing system can supply (e.g., send or make available) the updated dataset to a control system configured to adjust operation of a vehicle using at least the updated dataset.

Figure 8:
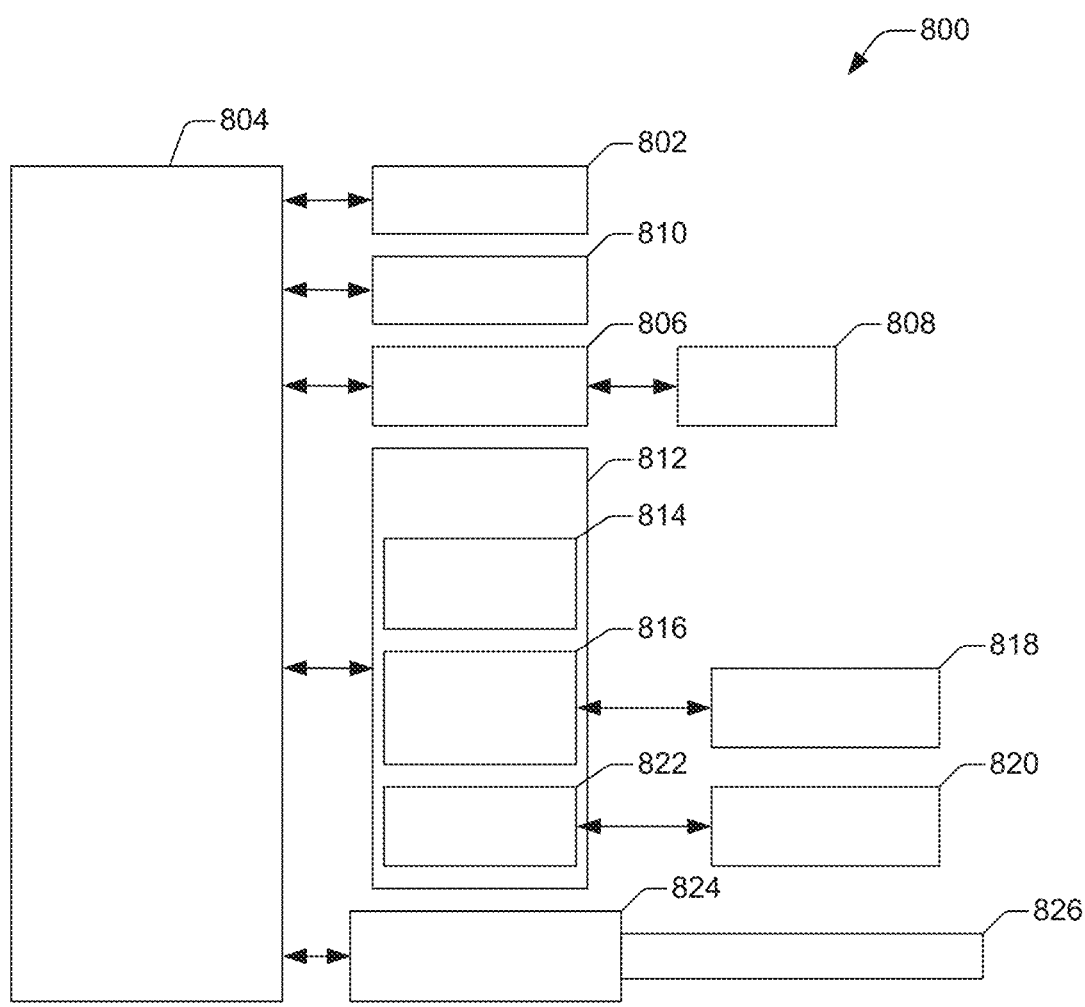
FIG. 8 presents an example of a computing system that can be used to implement one or more embodiments of the disclosure.

FIG. 8 illustrates a high-level block diagram of a computing system 800 that can implement one or more aspects of the one or more embodiments of the disclosure. Computing system 800 can correspond to, at least, a system that is configured to test various systems, for example. Computing system 800 can correspond to an interface device, a conversion device, and/or a network simulation device. Computing system 800 can be used to implement hardware components of systems capable of performing methods described herein (e.g., example method 700). Although one exemplary computing system 800 is shown, computing system 800 includes a communication path 826, which connects, via a communication interface 824, the computing system 800 to one or more additional systems (not depicted in FIG. 8). Computing system 800 and additional system(s) can be in communication via the communication path 826 and the communication interface 824, e.g., to communicate data between them.

Computing system 800 includes one or more processors, such as processor 802. Processor 802 is connected to a communication infrastructure 804 (e.g., a communications bus, cross-over bar, or network). Computing system 800 can include a display interface 806 that forwards graphics, textual content, and other data from communication infrastructure 804 (or from a frame buffer not shown) for display on a display unit 808. Computing system 800 also includes a main memory 810, preferably random access memory (RAM), and can also include a secondary memory 812. There also can be one or more disk drives 814 contained within secondary memory 812. Removable storage drive 816 reads from and/or writes to a removable storage unit 818. As will be appreciated, removable storage unit 818 includes a computer-readable medium having stored therein computer software and/or data.

In alternative embodiments, secondary memory 812 can include other similar means for allowing computer programs or other instructions to be loaded into the computing system. Such means can include, for example, a removable storage unit 820 and an interface 822.

Various embodiments of the disclosure may take the form of an entirely or partially hardware embodiment, an entirely or partially software embodiment, or a combination of software and hardware (e.g., a firmware embodiment). Further, as described herein, various embodiments of the disclosure (e.g., systems and methods) may take the form of a computer program product including a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can be embodied in or can include ROM; RAM; magnetic disk storage media; optical storage media; flash memory, etc.

Unless otherwise expressly stated, it is in no way intended that any protocol, procedure, process, or technique put forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "environment," "system," "module," "component," "architecture," "interface," "unit," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures in order to optimize space usage or enhance the performance of systems, devices, or other electronic equipment in accordance with this disclosure. For instance, a processor can include molecular transistors and/or quantum-dot based transistors, switches, and gates.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

As used herein, the term device can refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method, comprising:
generating a first beamforming map using at least a first response function of an antenna array of a radar system and data representative of electromagnetic signals received at the antenna array of the radar system;
determining multiple reflection detection points using at least the first beamforming map;
generating a second beamforming map using at least the data and a second response function of the antenna array, the second response function has a first minimum at a first reflection detection point of a subgroup of the multiple reflection detection points and a second minimum at a second reflection detection point of the subgroup;
determining a ratio between a first amplitude of a third reflection detection point in the second beamforming map and a second amplitude of the third reflection detection point in the first beamforming map;
determining that the ratio is less than a threshold value; and
classifying the third reflection detection point as an apparent reflection point that does not correspond to an object in a field of view of the radar system.

2. The method of claim 1, further comprising updating a dataset indicative of the multiple reflection detection points by removing the third reflection detection point from the dataset.

3. The method of claim 2, further comprising supplying the updated dataset to a control system configured to adjust operation of a vehicle using at least the updated dataset.

4. The method of claim 1, further comprising determining a ratio between a first amplitude of a fourth reflection detection point in the second beamforming map and a second amplitude of the fourth reflection point in the first beamforming map;
determining that the ratio is greater than the threshold value; and
classifying the fourth reflection detection point as a physical reflection point.

5. The method of claim 1, wherein the determining that the ratio is less than the threshold value comprises determining that the ratio is less than about 15 dB.

6. The method of claim 1, wherein the generating the second beamforming map comprises determining an array having multiple response functions corresponding to the first response function evaluated at respective ones of the multiple reflection detection points.

7. The method of claim 1, wherein the generating the second beamforming map further comprises generating the second response function by solving an optimization problem with respect to an objective function based at least on the array and subject to a constraint indicative of a conservation rule, and wherein the conservation rule requires that the second response function preserve unit gain at the third reflection detection point relative to the first response function.

8. A system, comprising:
at least one processor; and
at least one memory device coupled to the at least one processor, the at least one memory device having instructions encoded thereon that, in response to execution, cause the at least on processor to perform or facilitate operations comprising:
generating a first beamforming map using at least a first response function of an antenna array and data representative of electromagnetic signals received at the antenna array;
determining multiple reflection detection points using at least the first beamforming map;
generating a second beamforming map using at least the data and a second response function of the antenna array, the second response function has a first minimum at a first reflection detection point of a subgroup of the multiple reflection detection points and a second minimum at a second reflection detection point of the subgroup;
determining a ratio between a first amplitude of a third reflection detection point in the second beamforming map and a second amplitude of the third reflection point in the first beamforming map;
determining that the ratio is less than a threshold value; and
classifying the third reflection detection point as an apparent reflection point.

9. The system of claim 8, the operations further comprising updating a dataset indicative of the multiple reflection detection points by removing the third reflection detection point from the dataset.

10. The system of claim 9, the operations further comprising supplying the updated dataset to a control system configured to adjust operation of a vehicle using at least the updated dataset.

11. The system of claim 8, the operations further comprising determining a ratio between a first amplitude of a fourth reflection detection point in the second beamforming map and a second amplitude of the fourth reflection point in the first beamforming map;
determining that the ratio is greater than the threshold value; and
classifying the fourth reflection detection point as a physical reflection point.

12. The system of claim 8, wherein the determining that the ratio is less than the threshold value comprises determining that the ratio is less than about 15 dB.

13. The system of claim 8, wherein the generating the second beamforming map comprises determining an array having multiple response functions corresponding to the first response function evaluated at respective ones of the multiple reflection detection points.

14. The system of claim 8, wherein the generating the second beamforming map further comprises generating the second response function by solving an optimization problem with respect to an objective function based at least on the array and subject to a constraint indicative of a conservation rule, and wherein the conservation rule requires that the second response function preserve unit gain at the third reflection detection point relative to the first response function.

15. The system of claim 8, wherein the antenna array is functionally coupled to at least one of a radar system or a light detection and ranging system.

16. A vehicle, comprising:
an antenna array configured to receive electromagnetic signals from an environment surrounding the vehicle; and
a beamforming apparatus functionally coupled to the antenna array and configured at least to:

generate a first beamforming map using at least a first response function of the antenna array and data representative of the electromagnetic signals;

determine multiple reflection detection points using at least the first beamforming map;

generate a second beamforming map using at least the data and a second response function of the antenna array, the second response function has a first minimum at a first reflection detection point of a subgroup of the multiple reflection detection points and a second minimum at a second reflection detection point of the subgroup;

determine a ratio between a first amplitude of a third reflection detection point in the second beamforming map and a second amplitude of the third reflection detection point in the first beamforming map;

determine that the ratio is less than a threshold value; and classify the third reflection detection point as an apparent reflection point.

17. The vehicle of claim 16, wherein the beamforming apparatus is further configured to determine a ratio between a first amplitude of a fourth reflection detection point in the second beamforming map and a second amplitude of the fourth reflection point in the first beamforming map;

determine that the ratio is greater than the threshold value; and classify the fourth reflection detection point as a physical reflection point.

18. The vehicle of claim 16, wherein to generate the second beamforming map, the beamforming apparatus is further configured to determine an array having multiple response functions corresponding to the first response function evaluated at respective ones of the multiple reflection detection points.

19. The vehicle of claim 16, wherein the generating the second beamforming map further comprises generating the second response function by solving an optimization problem with respect to an objective function based at least on the array and subject to a constraint indicative of a conservation rule, and wherein the conservation rule requires that the second response function preserve unit gain at the third reflection detection point relative to the first response function.

20. The vehicle of claim 17, further comprising a control apparatus, wherein the beamforming apparatus is further configured to supply the updated dataset to the control apparatus configured to adjust operation of the vehicle using at least the updated dataset.

* * * * *